Jan. 26, 1932. W. B. FETNER 1,842,964
SAFETY CUTTER HOLDER FOR SHAPER SPINDLES
Filed July 9, 1931

INVENTOR
William B. Fetner
by his attorneys
Byrnes, Stebbins, Parmelee & Blenko

Patented Jan. 26, 1932

1,842,964

UNITED STATES PATENT OFFICE

WILLIAM B. FETNER, OF LATROBE, PENNSYLVANIA, ASSIGNOR TO LATROBE TOOL COMPANY, OF LATROBE, PENNSYLVANIA, A CORPORATION OF PENNSYLVANIA

SAFETY CUTTER-HOLDER FOR SHAPER SPINDLES

Application filed July 9, 1931. Serial No. 549,663.

My invention relates to means for securing cutter blades or knives to the spindle of a woodworking shaper.

Shaper cutters are usually formed from sections of a bar of tool steel having beveled edges so that the cross section of the bar is in the shape of a trapezoid. Cutters are formed by taking short lengths of the bar and grinding the ends of the sections to a sharp edge of the desired contour for any given piece of work. Numerous devices have been proposed heretofore for securing cutters to shaper spindles but, for one reason or another, such means have not been placed in general use. The cutter-holder usually employed heretofore in actual practice comprises a pair of collars having transverse V-shaped grooves therein, one wall of the grooves being vertical. The collars are bored out for a slip-on fit with the spindle and the cutters are secured to the spindle by placing their edges in the grooves and clamping the collars together by means of a clamping nut threaded on the spindle.

Many objections to this type of cutter-holder exist. In the first place, since the beveled edges of the cutters seat in the V-shaped transverse grooves in the collars, it is necessary that the sharp edge of the cutter engaging the collar be rounded or flattened to prevent the grooves being deformed by the edges of the cutters.

A more serious objection arises from the fact that the holding collars have practically only a line contact with the cutters and, therefore, are ineffective to properly hold the cutters at the high speeds at which shaper spindles operate, even though the clamping nuts are screwed down very tightly. Since the sides of the V-shaped grooves in the clamping collars are fixed relative to each other, it is possible that the collars will grip the cutters only at a few points, and it is therefore impossible to obtain the desired grip on the cutter. The same condition occurs in case the cutters differ slightly in width. The clamping collars will seat first on the wider cutter and the narrower cutter might be quite loose in the collar grooves despite heavy clamping pressure exerted by the spindle nut.

The hazard introduced by the old type of clamping collars will be apparent. It is necessary in shaper operation that the workman stand very close to the spindle and, at the high speeds of rotation attained by the spindle, the slightest looseness of the cutters may have a disastrous result. The problem is made even more difficult of solution by the high speed and vibration characterizing the operation of the machine, since loosening of the cutters on the spindle results therefrom.

I have invented a novel form of collar for holding shaper cutters, which considerably enhances the safety of shaper operation because of the greater rigidity with which the cutters are held in the grip of the clamping collars. In accordance with the invention, I provide clamping collars adapted to slip on a shaper spindle. The collars are recessed transversely and the walls of the recess are beveled to correspond with the beveled edges of the usual shaper steel. The function of the beveled edges on the collars is to provide lateral pressure against the cutters. Within the recess in the collars and between the lugs extending axially thereof formed by the recesses, I position inserts or spacing blocks which are also bored for a loose fit with the spindle. The spacing blocks have a substantial clearance with the collar slot and are provided with plane faces for engagement by the flat faces of the cutters. The upper insert has small shoulders overhanging the upper edges of the cutters to position the insert relative to the cutters.

When the clamping nut is tightened, the beveled surfaces on the clamping collars engage the beveled edges of the cutters and force the flat faces of the latter against the plane faces of the inserts or spacing blocks. The clearance between the collars and inserts permit slight shifting of the former to compensate for any slight difference in the width of the cutters. Since the sides of the V-shaped grooves formed by the beveled surfaces on the collars and the plane surfaces on the inserts are relatively movable, the cutters are firmly gripped over a wide area so that loosening of the cutters during operation is prevented.

For a complete understanding of the invention, reference is made to the accompanying drawings representing a present preferred embodiment of the invention. In the drawings.

Figure 1:
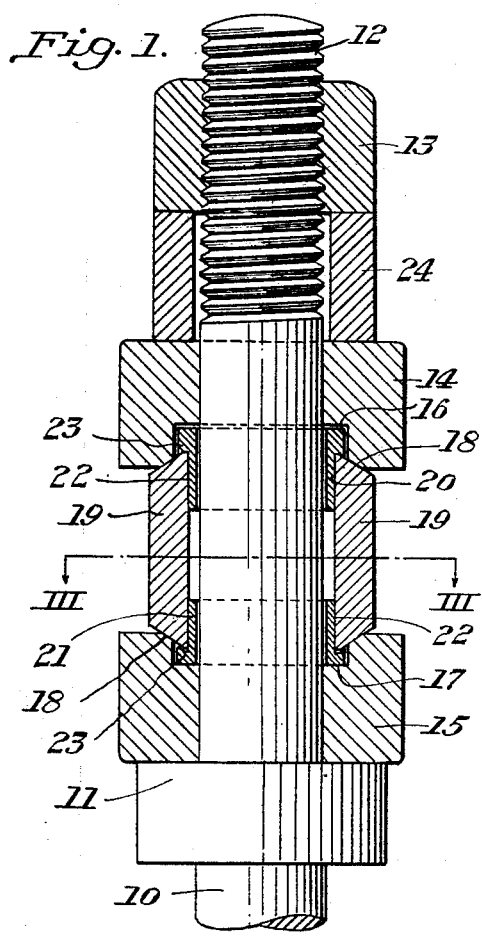
Figure 1 is a central sectional view taken through the cutter-holder of my invention and the cutters mounted therein, showing a shaper spindle in elevation.
Figure 2:
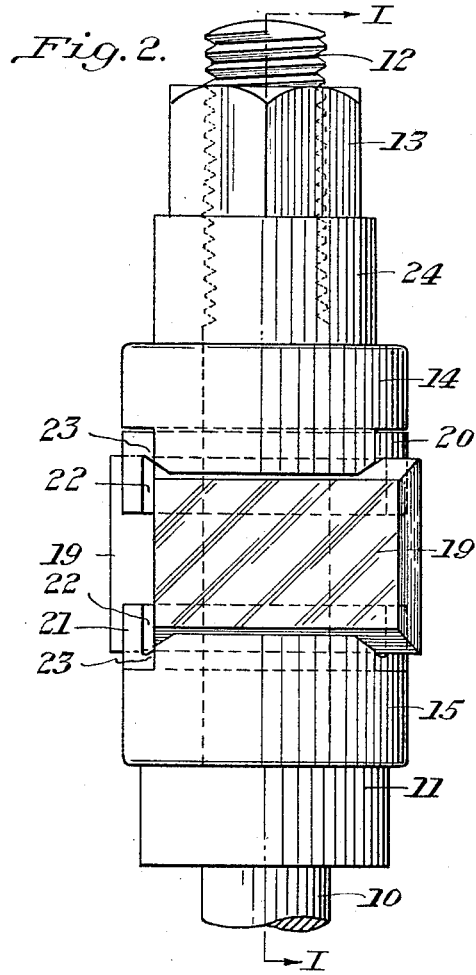
Figure 2 is a side elevation of the invention taken at right angles to the plane of Figure 1; line I—I of Figure 2 indicates the plane of the section shown in Figure 1.
Figure 3:
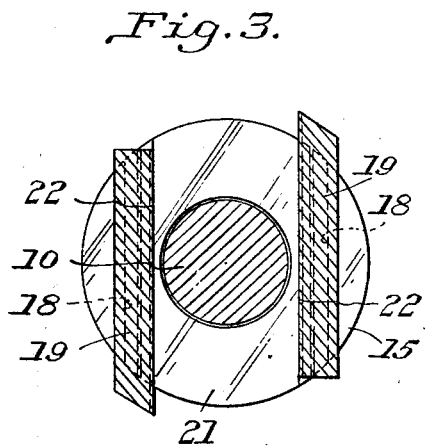
Figure 3 is a sectional view along the line III—III of Figure 1.
Figure 4:
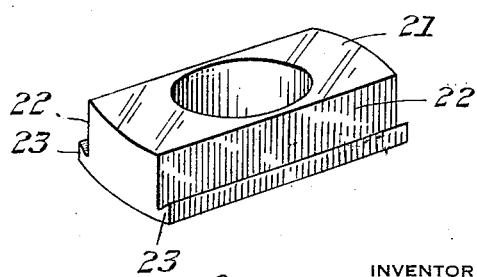
Figure 4 is a perspective view of one of the inserts or spacing blocks.

Referring now in detail to the drawings, a shaper spindle 10 projects upwardly through a hole in the shaper table. An integral shoulder 11 is formed on the spindle and the upper end 12 thereof is threaded for receiving a clamping nut 13. The means for securing the cutters to the spindle includes top and bottom clamping collars 14 and 15. As shown, the collars are of substantial thickness and have an axial bore providing a slip-on fit with the spindle 10. Opposing faces of the collars are recessed as at 16 and 17 by transverse slots. The edges of the slots are beveled as at 18 for engaging cutters such as those shown at 19.

Inserts or spacing blocks 20 and 21 are seated in the recesses 16 and 17 with a free all-around clearance with respect thereto. The function of the spacing blocks 20 and 21, of course, is to resist the inward pressure on the cutters 19 caused by clamping together the collars 14 and 15 and, thereby, to grip the cutters tightly between the relatively movable sides of the V-shaped grooves constituted by the beveled edges 18 of the collars 14 and 15 and plane surfaces 22 formed on the inserts 20 and 21.

In order to position the upper insert 20 properly, I prefer to provide an overhanging shoulder 23 on each side thereof to rest on the upper beveled edge of the cutters 19. Although the bottom insert 21 normally rests on the bottom of the recess 17 in the collar 15, it may also be provided with shoulders, if desired. It will be noted that the sharp edges at the intersection of the beveled edges of the cutters 19 and their inner flat faces do not sustain any axial pressure.

There is likewise no pressure transmitted axially through the inserts 20 and 21. An axial clearance between the collar 14 and the insert 20 is provided, as well as a similar clearance between the lower edges of the cutters and the shoulders 23 on the insert 21. The beveled edges of the slots 16 and 17, therefore, exert all the axial pressure against the cutters 19 and, at the same time, force the latter into firm engagement with the plane surfaces 22 of the inserts. The only pressure sustained by the latter, therefore, is that which is effective transversely of their length.

A spacing sleeve 24 may be positioned on the spindle 10 between the clamping nut and the collar 14. In addition to the clamping nut 13, a locking nut may be employed.

It will be apparent from the foregoing description that the invention provides means for exerting a much greater clamping force upon shaper cutters having beveled edges than has been possible heretofore with the types of clamping collars now in use. The sides of the grooves in which the beveled edges of the cutters are received are not fixed relative to each other but are movable so that they can align and adjust themselves to the position in which maximum the gripping effect is produced. The clearance provided axially between the clamping collars and the inserts prevents the application of direct axial pressure to the sharp edges of the blades and it is not necessary, therefore, that they be flattened or rounded. The lateral clearance between the inserts and the axial projecting lugs at the sides of the recesses in the clamping collars insure perfect gripping of both cutters even though there is a slight difference in the width thereof, since the collars, by virtue of their clearance with respect to the inserts, can adjust themselves on the beveled edges of the cutters so as to apply the greatest clamping pressure thereto.

In addition to the foregoing advantages, the invention is also characterized by extreme simplicity so that it can be manufactured at relatively low cost. There are no complicated adjustments to be made and the invention lends itself to the rapid change and easy adjustment of cutters on the shaper spindle. Although the cutters 19 have been shown herein with straight cutting edges, it is obvious that the cutting edges may be given any contour desired, depending upon the nature of the work in hand.

Although I have illustrated and described herein but a single present preferred embodiment of the invention, it will be realized that many changes in the exact details shown may be made without departing from the spirit of the invention as set forth in the appended claims, or sacrificing the advantages and novel results hereinabove enumerated. As an example, the thickness of the inserts may be increased for cutters of various widths. The invention, obviously, is well adapted for cooperation with cutters of different widths, without any change whatever in the construction shown, although an increased depth of the inserts might be desirable.

I claim:

1. Cutter holding means for shaper spindles comprising a pair of collars adapted to be clamped on a spindle, transverse recesses in said collars having beveled edges for engaging the beveled edges of a cutter, and inserts seated in said recesses for engaging a surface of a cutter having its beveled edges gripped between said collars.

2. A holder for shaper steel having beveled edges and plane faces, comprising a pair of clamping collars, transverse slots therein having beveled edges adapted to receive and engage the edges of the steel, and inserts in said slots having flat surfaces for engaging and gripping said faces on the clamping of the steel between the collars.

3. Means for securing to a spindle a cutter in the shape of a flat bar with beveled edges, comprising top and bottom clamping collars having transverse slots with beveled edges, and inserts for said collars having plane surfaces adjacent the beveled edges of said slots defining intersecting planes on separate members for receiving and gripping the beveled edges of said bar.

4. Means for clamping cutters having plane faces and beveled edges to a spindle, comprising collars having plane surfaces for engaging the plane faces of the cutters, and independent collars having surfaces for engaging the beveled edges of the cutters and forcing the plane faces against the plane surfaces of said first mentioned collar.

5. Means for securing to a shaper spindle, cutters having plane faces and beveled edges, comprising clamping blocks with plane faces received on the spindle for engaging the faces of the cutters, and clamping collars having beveled faces for engaging the edges of the cutters to force the cutter faces against the blocks.

6. Cutter holding means for securing cutter blades having beveled edges and plane faces to a shaper spindle, comprising a bottom collar adapted to seat on the spindle, a transverse slot in the collar having beveled edges for engaging similarly shaped portions of said blades, an insert seated in the collar slot and having plane surfaces adapted to engage the faces of the blades, and a similar collar and insert for engaging the upper edges of the blades.

7. A tool holder for cutters having plane faces and beveled edges, comprising clamping collars having transverse slots with beveled edges, and inserts seated in said slots, having free clearance therein, said inserts and slot edges defining angular recesses with independent sides for the edges of said cutters.

8. In a shaper head, a spindle, spacing blocks with plane lateral surfaces bored to slip on the spindle, clamping collars having projections fitting over said blocks and provided with beveled surfaces cooperating with said plane surfaces to define angular grooves with independent sides for receiving the beveled edges of a cutter.

9. A tool holder comprising top and bottom collars bored to slip on a spindle, having transverse slots with beveled sides, top and bottom inserts bored to clear the spindle, fitting loosely in said slots, and having plane faces cooperating with the beveled sides of said slots to form angular grooves with relatively movable sides for receiving the beveled edges of shaper cutters.

10. A tool holder comprising top and bottom collars bored to slip on a spindle, having transverse slots with beveled sides, top and bottom inserts bored to clear the spindle, fitting loosely in said slots, and having plane faces cooperating with the beveled sides of said slots to form angular grooves with relatively movable sides for receiving the beveled edges of shaper cutters, said top insert having offset shoulders engaging the upper edges of the cutters to position the insert relative thereto.

11. A holder for shaper cutters comprising top and bottom collars bored to slip on a shaper spindle and having axial lugs with beveled surfaces, and top and bottom clamping blocks with plane surfaces seated loosely between said lugs, providing, with said beveled surfaces, angular grooves with independent sides for receiving the beveled edges of a cutter blade.

12. A holder for shaper cutters comprising top and bottom collars bored to slip on a shaper spindle and having axial lugs with beveled surfaces, and top and bottom clamping blocks with plane surfaces seated loosely between said lugs, providing, with said beveled surfaces, angular grooves with independent sides for receiving the beveled edges of a cutter blade, said blocks having axial clearance relative to the collars to prevent transmission of axial clamping pressure therethrough.

13. A holder for shaper cutters comprising top and bottom collars bored to slip on a shaper spindle and having axial lugs with beveled surfaces, and top and bottom clamping blocks with plane surfaces seated loosely between said lugs, providing, with said beveled surfaces, angular grooves with independent sides for receiving the beveled edges of a cutter blade, said bottom block resting on said bottom collar and said top block having means for supporting it adjacent the upper edge of the cutter.

In testimony whereof I have hereunto set my hand.

WILLIAM B. FETNER.